Patented May 24, 1949

2,470,769

UNITED STATES PATENT OFFICE 2,470,769

COLOR PHOTOGRAPHIC MATERIAL AND PROCESSES FOR PRODUCING SAME

Bela Gaspar, Hollywood, Calif., assignor to Chromogen Incorporated, a corporation of Nevada No Drawing. Application May 29, 1944, Serial No. 537,967. In Great Britain August 28, 1939

19 Claims. (Cl. 95—6)

REISSUED
APR 17 1951
RE 23357

This application is a continuation in part of my application S. N. 354,442, filed August 27, 1940, now abandoned, and relates to improved photographic light-sensitive materials in which at least one of the light-sensitive emulsions, used in the form of superposed layers of a multilayer material or in the form of differently sensitized and differently colored emulsion particles distributed within the same layer, is dyed with an azo dye and to improvements in or relating to the process of producing the same.

The invention has for its purpose the provision of improved material which can be produced in a very simple and reliable manner and in which the dye used for coloring the light-sensitive emulsion has only a negligible tendency to bleed or to diffuse during the manufacture, the storage or the processing of the material.

It is already known to use water-insoluble dyes for coloring the light-sensitive emulsions or layers, the insoluble dyes being introduced as such or produced within the colloid from their components, by dye synthesis, or from their soluble derivatives, by decomposition. It is obvious that the coloring of the colloid by means of a soluble dye is much simpler than the incorporation of insoluble dyes, it only being necessary to add the dye solution to the colloidal solution or emulsion. On the other hand, it is a well-known fact that most of the water soluble azo dyes have a strong tendency to diffuse and that owing to this property it becomes necessary to precipitate the soluble dye within the colloid by a precipitating agent. There are only a restricted number of soluble dyes available which can be used without precipitating agent, such as, for example, the dyes referred to and used according to my prior British Patent Specification No. 445,806.

According to the present invention light-sensitive silver halide emulsions used in the form of superposed layers in a multilayer material or in the form of differently sensitized and differently colored particles are dyed by a water or alkali-soluble polymeric azo dye derived from a diazotized aromatic amino compound which is capable of coupling with itself, the dye molecule being formed by such coupling and containing a chain wherein a plurality of azo groups are positioned in alternating relationship with radicals of said aromatic compound. It has been found that from low-molecular aromatic components, there can be obtained by coupling of the diazotized aromatic amino compound with itself, dyes which have a high molecular weight and which, on the one hand, are water-soluble but, on the other hand, have only a negligible tendency to bleed or diffuse. Such dyes may readily be employed in the light-sensitive silver halide emulsions or in dyed filter layers adjacent to a light-sensitive silver halide emulsion layer. Layers dyed according to the invention are particularly useful for carrying out the process of producing dye images by local destruction of the azo dye described, for example, in my prior United States Letters Patent No. 2,020,775, dated November 12, 1935.

As examples of suitable dyes of the kind defined above there may be cited the azo dye obtained by coupling N-(p-aminobenzoyl)-H-acid with itself or by coupling 1-amino-4-salicoylamino-benzene-2-sulphonic acid with itself. The process of producing dyes of this kind may be described by way of an example as follows:

*Example 1.*—N-(p-aminobenzoyl)-H-acid (sodium salt) is dissolved in water and diazotized by acidifying the solution with acetic acid and adding sodium nitrite solution. The diazonium salt solution is kept at low temperature for about an hour. Thereafter, sodium carbonate is added to render the solution alkaline and the solution is heated, thereafter, to about 50-60° C. A magenta dye is formed which is salted out by common salt. The dye may be represented by the following formula, omitting any terminal groups which may be present, which discloses the character of the units going to make up the polymeric dye substance:

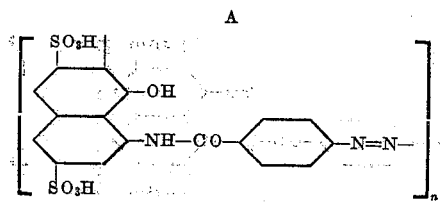

or by the formula:

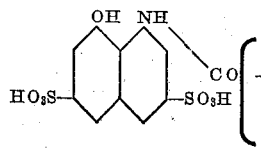 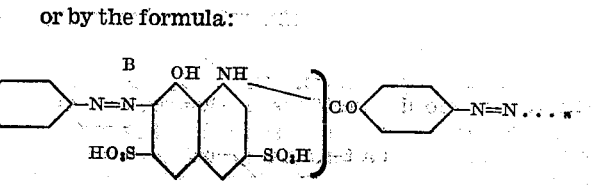

in which the portion enclosed by the ( ) may be considered an azo dye unit. The letter $n$ in both formulae represents an integer greater than one indicating the chain characteristic wherein a plurality of azo groups are alternating with radicals of the aromatic compound. If the high molecular weight polymeric dye as shown in Formula B is reduced it can readily be seen how it will break down to form a product of low molecular weight which can be represented

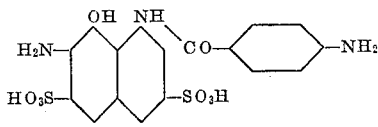

and whose similarity to the units which went to make up the polymeric dye, Formula A, is readily apparent.

For coloring emulsions the dye is dissolved in water and the solution is added to the light-sensitive emulsion to diffusely distribute the dye throughout the light-sensitive emulsion. For producing filter layers the dye solution is mixed with a gelatin solution which is coated to form a filter layer on a light-sensitive layer. For coloring light-sensitive emulsions about 1–2 grams of the dye are used per sq. m. emulsion layer to obtain a diffusely dyed layer. Differently colored layers in which one or more layers are dyed by means of the dyes defined above may be coated in superposition on a common support.

*Example 2.*—5 - ( - p - amino - benzoylamino) - phenol-2-sulphonic-acid is diazotized in known manner and to the diazo solution is added 4% ammonia solution and 5% pyridine. After coupling, the solution is acidified with dilute hydrochloric acid, and the resulting yellow dye is salted out and filtered. The dye has a good solubility and shows no diffusion in gelatine. About 0.3 to 1.0 g. dye can be used per square meter coating.

The azo dyes disclosed in the above description are large molecules containing several azo-dye units; these azo-dye units alternating with heteronuclear bonds which link said azo-dye units together. The following general formula, omitting any terminal groups which may be present, represents the character of the dyes:

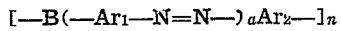

where $Ar_1$ and $Ar_2$ stand for aromatic heterocyclic, or aliphatic radicals, capable of carrying azo groups, $-N=N-$ stands for an azo linkage, and B for a heteronuclear bond connecting two dye units,

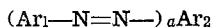

and where $n$ represents an integer greater than one. The letter $a$ means one, in the case of the dyes disclosed above. However, I have found that other values for $a$ are also possible, as will be described in greater detail. The expression "heteronuclear bond" means a chemical linkage interrupting the system of conjugation, and, therefore, practically excluding any essential influence of a dye unit (or groups within such a dye unit) on the color characteristics of any one of the other azo-dye units beyond the bridge B. The expression "azo-dye unit" means that part of the molecule limited by two heteronuclear bonds (or by one bond if it is a terminal group) and which determines the spectral qualities of the dye. If a dye of the indicated formula (where $a$ equals one) is reduced, a product of the formula

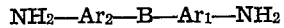

is formed. The size of this reduction product depends only on the size of the single components and is independent of the value for $n$ in the original dye. The reduction product of a non-diffusing high molecular dye of the indicated formula is, therefore, easily removable from a photographic colloid by washing.

It has been found the polymeric dyes prepared in other ways than described above have the same advantages and serve as well for coloration of photographic colloids; particularly silver halide emulsions containing gelatine, or other water-soluble or water-permeable colloids, such as methyl cellulose or cellulose glycolic acid, polymeric vinyl derivatives, and other colloids used for multilayer color photographic materials whereby in each differently sensitized silver halide layer a differently colored dye is incorporated.

The dyes, according to the invention, are represented by the same general formula given above; the new dyes may contain identical or unidentical dye units, and every single dye unit itself may contain one or more azo groups. The number of units, $n$, is determined or undetermined. In order to clarify the objects of the invention, a detailed description and further definitions are given as follows:

1. *The dye unit*

Any low molecular weight azo dye which is capable of being linked to other (identical or unidentical) azo dyes by a heteronuclear bond is a dye unit according to the definition of the present specification. This azo-dye unit can be a monoazo dye or a true disazo, trisazo, or polyazo dye. The expression "true polyazo dye" means a polyazo dye, the azo groups of which are linked together by a conjugated system, and which, therefore, influence the chemical and optical qualities of each other. The letter $a$ in the general formula given above indicates the number of azo groups within one azo-dye unit. In the case of a monoazo dye $a$ is one. If the azo dye unit is a true disazo dye $a$ becomes two, and in a trisazo dye $a$ assumes the value of three. A polymeric polyazo dye ($a>1$ and $n>1$ in the general formula) upon reduction gives $n(a-1)$ molecules of the formula,

and $n-1$ molecules of the formula

exclusive of the terminal molecules all of which are easily removable from the photographic colloid, independently of the polymeric grade $n$ of the original dye.

2. *The combination of dye units*

The dye units, linked together by a heteronuclear bond are, in the simplest case, identical. However, they may be different as well. These different dye units linked together can be of identical or different coloration; one azo-dye unit may be a monoazo dye and the next azo-dye unit may be a polyazo dye. It is, therefore, possible to combine different yellow, magenta, or blue-green azo-dye units to form yellow, magenta, red, cyan, violet, green or black dyes.

3. *The heteronuclear bond*

The dye units contained in the polymeric dye are bound by a carbon to carbon linkage or by any bridge formed by substituted carbon atoms or hetero-atoms, such as, for example, —Ar—O—, —O—, —S—, —SO₂—, —CO—, —NH—CO—, alkylene, arylene, —O—alkylene—O—, —O—arylene—O—, N≡, —NH—CO—NH—, —Ar—CO—, SO₂NH—, —NH—X—NH—, and —NH—Y—NH— wherein X is the divalent radical of a dibasic organic acid and Y is a bivalent hydrocarbon residue. Any radical is suitable provided that it interrupts the conjugation of the chain, and that it does not increase the molecular weight or decrease the solubility of the resulting reduction project to such an extent that it will prevent the removal or dissolution of the product from the photographic layer.

4. Substituents within the dye units

The dye units may contain one or more solubilizing groups such as, for example, sulphonic or carboxylic acid groups which make them water soluble either in the free acid form or in the form of salts; or they might contain groups which facilitate their solubility in organic solvents, or both in water and organic solvents, or in a mixture of water and organic solvents. Such groups are hydroxyalkyl groups, polyhydroxyalkyl groups, hydroxy-amino-alkyl, quaternary amino groups, and many other substituents. According to the invention the solubility properties of the dyes are selected only with respect to the most suitable solvent for a chosen photographic colloid since they have, in spite of their great solubility, no tendency toward diffusion, and, furthermore, after reduction they form low molecular weight reduction products which can be easily removed from a photographic colloid by washing, or which go into solution already during the reduction of the polymeric azo dye. Up to now it has been considered necessary to use dyes which contained only a minimum number of solubilizing groups; or to increase the molecular weight of soluble dyes by attaching substituents such as long chain fatty acid derivatives, or other high molecular weight substituents which reduce the solubility of the dyes or which prevent the easy or complete removal of the reduction products, thereby affecting the whites of the resulting photographic dye images. Another disadvantage of such methods consists in too low a tinctorial power of the dyes weighted by high molecular substituents so that to reach the necessary dye densities, a too large quantity of dye has to be used.

5. The polymeric grade n

It depends on the methods of synthesis chosen if the polymeric grade $n$ is determined or undetermined.

The coupling of a polydiazo compound with a coupling compound having two or more coupling positions yields a polymeric azo dye where $n$ is large but not determined. Another method to synthesize polymeric dyes of large but undetermined molecular size consists in connecting monoazo, disazo, trisazo, or polyazo dyes, which have reactive groups in the terminal groups, with a bivalent reagent to link the single dyes into a polymeric azo dye of a larger molecule.

The synthesis of dyes having a determined molecular size can be performed, i. e., by coupling a diazo or tetrazo compound with a coupling compound which contains an amino group capable of further diazotation and by diazotizing the resulting amino-azo dye and coupling with an equal or similar coupling compound. This operation is repeated as often as necessary to obtain a polymeric azo dye of sufficiently large molecular weight. After each operation a diffusion test is made and a non-diffusing dye results after reaching a suitable size of molecule. The number of dye units required to reach a dye stable to diffusion varies with the chemical properties of the coupling compound and also with the properties of the photographic colloids used, and can be easily determined by simple diffusion tests for each dye. The diffusion test may be carried out, for example, in the following manner, i. e., a quantity of colorless 5 to 10 per cent gelatine or other photographic colloid solution is coated on a base such as celluloid film or glass plate and dried. A second coating is placed on top of this clear coating, using the same concentration of colloid to which a solution of the dye has been added in sufficient quantity to reach the desired dye density. After drying, the material is soaked in water, and the upper layer is removed with a sharp instrument, and the lower clear layer examined for evidence of diffusion. In most cases the material is carried through a sequence of photographic processing baths such as the developer, fixing bath, dye bleach, etc., and after final washing the dyed layer is removed and the lower clear layer examined for evidence of diffusion.

The polymeric grade $n$ required to render the dye stable towards diffusion is inversely proportional to the number $a$ of azo groups within one azo-dye unit. I have found that the product $a \times n$ must be greater than two in order to prevent diffusion of the dyes in the processing baths. However, a higher polymeric degree than the minimum degree is preferable and does not adversely affect the solubility and tinctorial power of the dye nor the molecular size of the reduction products of the dye.

The above mentioned general methods are illustrated by the following specific examples. There are, of course, many forms of the invention other than described in these specific examples.

*Example 3.*—9.3 grams of aniline are diazotized and coupled in known manner with 22 grams of 1-[4-amino-phenyl]-5-pyrazolone - 3 - carbonic acid (Beilstein, Handbuch der Organischen Chemie, 4th ed., supplementary vol. XXV, page 568) in sodium carbonate solution. After completion of the coupling the resulting dye is salted out, filtered off, washed and dissolved in water. 6.9 grams of sodium nitrite are added to the dye solution which is then poured into 35 ml. of hydrochloric acid (D=1.19) diluted with ice water. After stirring at a temperature below 6° C. for 1 hour the resulting diazo compound is stirred into a solution of 22 grams of sodium carbonate and 22 grams of 1-[4-amino-phenyl]-5-pyrazolone-3-carbonic acid in 1 liter of water which contains 10% pyridine, and the mixture is kept at a temperature of 8° C. After stirring for an hour, the solution is heated, acidified with hydrochloric acid, and the dye is precipitated, filtered and washed with dilute hydrochloric acid. The dye is again diazotized and coupled with the same quantity of 1-[4-amino-phenyl]-5-pyrazolone-3-carbonic acid, as described above, and the resulting dye is precipitated with dilute hydrochloric acid. The dye, when tested for diffusion, shows with most gelatines only a slight diffusion. When two further diazotizations and couplings are performed in the same way as described above no diffusion occurs with the resulting dye. The dye is believed to have the following formula:

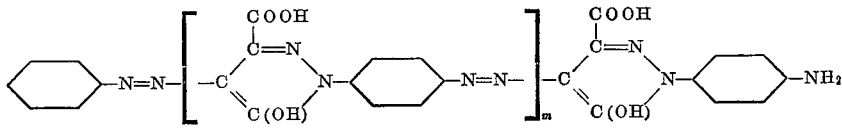

where $m$ stands for either two or four.

In the above example the aniline can be replaced with 12.7 grams of chloro-aniline or 17.3 grams of metanilic acid. Furthermore in any or in all of the couplings the 1-[4-amino-phenyl]-5-pyrazolone-3-carbonic acid can be replaced by other azo couplers, for instance, by 5-(p-amino-benzoylamino)phenol-2-sulphonic acid.

*Example 4.*—15 grams of acetyl-p-phenylendiamine are diazotized and coupled in known manner in sodium carbonate solution with 22 grams of 1-[4-amino-phenyl]-5-pyrazolone-3-carbonic acid. The dye is salted out, filtered off, dissolved in water and boiled with a 5% potassium hydroxide solution in order to split off the acetyl group. Thereafter the dye is salted out, filtered off, and dissolved in a sodium carbonate solution. Phosgene gas is introduced under cooling and stirring, whereby a polymeric azo dye is formed in which the dye units are linked by —NH—CO—NH— groups.

The same dye is obtained by tetrazotizing 24.2 grams of diamino-diphenylurea and coupling the same in a 20% pyridine solution with 26.8 grams of carbonyl-bis-1-(4-amino-phenyl)-5-pyrazolone-3-carbonic acid.

*Example 5.*—Instead of reacting the monoazo dye described in the foregoing example with phosgene, other acid chlorides derived from polyvalent acids, such as succinyl chloride, can be used: 33.9 grams of the monoazo dye described in Example 4 are dissolved in anhydrous pyridine, and 15.5 grams of succinyl chloride are stirred in small portions into the cooled solution. Half an hour after the addition of the chloride is completed, the temperature is raised to 50° C. and kept at this temperature for 1 hour. The dye is finally precipitated by adding, under cooling, dilute hydrochloric acid. After filtering off the dye is dissolved in sodium carbonate solution and purified by reprecipitation with acid. A polymeric yellow azo dye results in which the monoazo dye units are linked together with

—CO—CH₂—CH₂—CO— groups. A further variation consists in treating the monoazo dye of the Example 4 with 18.8 grams of ethylene bromide at 90° C. under reflux in dioxane in the presence of calcium carbonate. Hereby a polymeric azo dye is obtained, the monoazo dye units of which are connected by an ethylene bridge.

*Example 6.*—34.4 grams of benzidine-2,2-disulphonic acid are tetrazotized and coupled with 53.4 grams of 1,1'-[2,2'-disulpho-diphenylene-(4,4')]-bis-(5-pyrazolone-3-carbonic acid) (Beilstein, l. c.) in a cold aqueous solution of 10% pyridine. The yellow dye is precipitated with dilute hydrochloric acid solution, filtered off, and washed with alcohol. The dye, neutralized with 16.4 grams of sodium carbonate, forms a yellow solution in water which is ready for addition to a photographic colloid. For color photographic or filter purposes 0.3 to 1 gram of the dye is used per square meter. The photographic layers dyed with this dye are entirely free of diffusion. The probable structure of the dye is The isomer dye having the sulphonic acid groups attached in the 3,3'-position (instead of the 2,2'-position) of the diphenylene radicals has a similar shade.

*Example 7.*—a. 34.4 grams of benzidine-2,2'-disulphonic acid are tetrazotized in dilute hydrochloric acid solution in known manner. To this tetrazo solution, a solution containing 31.9 grams of H-acid, 8.3 grams of sodium acetate and 6 ml. of acetic acid is added slowly while stirring. The temperature is kept at 5° C. for 2 hours. A bluish-red monoazo dye forms. Thereafter about 80 ml. of pyridine are added whereby the bluish-red monoazo dye transforms into a blue-green polymeric dye. After 1 hour the solution is acidified with an excess of hydrochloric acid, and the polymeric blue-green azo dye precipitates in amorphous form. The liquid is decanted and the precipitate washed with 5% sodium chloride solution. For purification, the dye is dissolved in aqueous sodium carbonate solution, salted out, filtered and washed with 5% sodium chloride solution.

b. A dye similar to that described in Example 7a is obtained by the following procedure: 34.4 grams of benzidine-2,2'-disulphonic acid are tetrazotized in hydrochloric acid solution. To this tetraazo solution, a solution containing 63.8 grams of H-acid, 16.6 grams of sodium acetate, and 12 ml. of acetic acid is added in the same way as in Example 7a. After standing for two hours, to this solution which contains a magenta disazo dye, a tetraazo solution prepared with 34.4 grams of benzidine-disulphonic acid and 160 ml. of pyridine is added whereby a blue-green dye is formed which is isolated and purified as in Example 7a.

The probable formula of the dye formed in Example a is and the probable formula of the dye formed in Example b is:

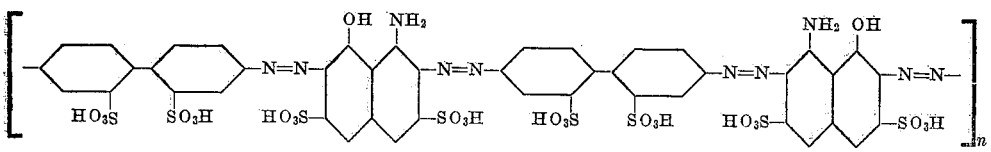

The dyes are well soluble in water and their gelatine coatings are free of diffusion into adjacent gelatine layers.

Instead of the tetrazotized benzidine -2,2'-disulphonic acid in the foregoing examples, a number of other tetrazo compounds may be used with equal success, such as for example: tetrazotized diaminodiphenylsulphone, diaminodiphenylsulphone-sulfonic acid, diaminodiphenylsulphone-disulphonic acid, dianisidine, diaminodiphenylmethane, diaminodibenzyl, diaminobenzophenone, diaminodiphenyl-sulphide, or diaminodiphenyl - ether. The aforementioned compounds might contain further substituents such as alkoxy, alkyl, oxyalkyl groups or halogens.

*Example 8.*—33.1 grams of 3,3'-diamino-4,4'-dimethoxy-diphenylmethane chlorohydrate are tetrazotized in known manner and coupled in 5% pyridine solution with 107.6 grams of p-amino-benzoyl-H-acid. The diamino disazo dye is precipitated with hydrochloric acid and sodium chloride, filtered off, dissolved in water and tetrazotized in acid solution with 13.8 grams of sodium nitrite and coupled with 107.6 grams of p-aminobenzyl-H-acid. The diamino tetrazo dye is isolated in the same way as described for the diamino disazo dye. The diamino tetrazo dye is tetrazotized and coupled again, following the identical procedure. It is advisable to purify the dyes in each step by dissolving and reprecipitating them. The final product is a magenta hexazo dye which is believed to have the following formula:

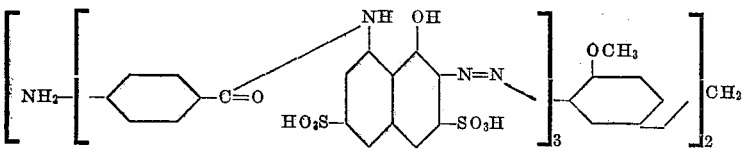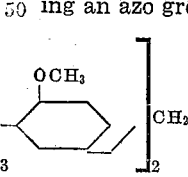

The dye has a good solubility in water and is added to a gelatine silver bromide emulsion in a quantity of 0.5 to 1 gram per square meter. It does not diffuse into adjacent gelatine layers.

In the above example in place of 3,3'-diamino-4,4'-dimethoxy-diphenylmethane many other diamino aryl compounds such as p-diaminodiphenyl ether, 2,2'-dichlorobenzidine, or diamino-diphenylurea can be used. The p-aminobenzoyl-H-acid can be substituted in one, two, or all coupling steps with aminoanisolsulfo-H-acid or aminobenzoyl-K-acid. Furthermore, the last coupling can be made with a coupling compound, which is free of diazotizable amino groups, such as p-toluenesulfo-H-acid or dichlorobenzyl-K-acid.

*Example 9.*—A trisazo dye is made in known manner by coupling diazotized 4-oxalylamino-aniline - 2 - sulfonic acid with 1-amino-naphthalene-7-sulfonic acid, diazotizing the resulting monoazo dye and coupling it with 1-amino-2-methoxynaphthalene-6-sulphonic acid. This dye is then diazotized and coupled in pyridine and ammonia with 2-amino-5-naphthol-7-sulfonic acid. The making of similar trisazo dyes is described in the U. S. Patent No. 1,602,991. The resulting trisazo dye is dissolved, and the oxalyl group is split off with cold 5% sodium hydroxide solution. Thereafter, the dye is salted out, filtered off, dissolved in a sodium carbonate pyridine solution and treated with phosgene gas. A blue-green polymeric azo dye is formed which is supposed to have the formula:

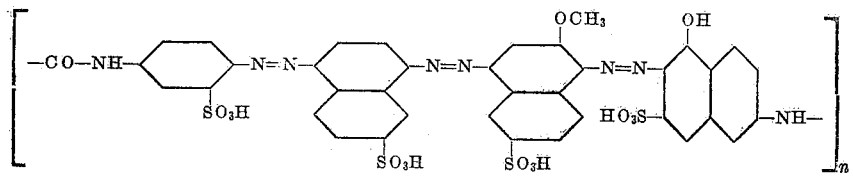

For color photographic purposes 0.5 to 1 gram of the dye can be used in silver halide emulsions per square meter.

What is claimed is:

1. A photographic material comprising at least two superposed colloid layers, at least one of the layers being a light sensitive silver halide emulsion layer and at least one layer comprising a high molecular weight dye which is soluble in a substance selected from the group consisting of water and aqueous alkali and which includes the following general structure $$(-Ar-N=N-)_n$$

formed by a plurality of identical low molecular weight members Ar—N=N, wherein Ar stands for a group which has both a coupling position and at least one salt-forming substituent and comprises an aromatic radical capable of carrying an azo group, n stands for an integer greater than one, said members Ar—N=N being linked together by the azo group of one member being attached to the coupling position of the next member.

2. A photographic material comprising two superposed colloid layers, at least one of the layers being a light sensitive silver halide emulsion layer comprising a high molecular weight dye which is soluble in a substance selected from the group consisting of water and aqueous alkali and which includes the following general structure $$(-Ar-N=N-)_n$$

formed by a plurality of identical low molecular weight members Ar—N=N, wherein Ar stands for a group which has both a coupling position and at least one salt-forming substituent and comprises an aromatic radical capable of carrying an azo group, $n$ stands for an integer greater than one, said members Ar—N=N being linked together by the azo group of one member being attached to the coupling position of the next member.

3. A photographic material comprising a light-sensitive silver halide emulsion and a high molecular weight dye in the presence of said silver halide which dye is soluble in a substance selected from the group of substances consisting of water and aqueous alkali and includes the following general structure $$(-Ar-N=N-)_n$$

formed by a plurality of identical low molecular weight members Ar—N=N, wherein Ar stands for a group which has both a coupling position and at least one salt-forming substituent and comprises an aromatic radical capable of carrying an azo group, $n$ stands for an integer greater than one, said members Ar—N=N being linked together by the azo group of one member being attached to the coupling position of the next member.

4. A photographic material having a layer comprising a light-sensitive silver halide emulsion and a high molecular weight dye which is soluble in a substance selected from the group of substances consisting of water and aqueous alkali and which includes the following general structure $$(-Ar-N=N-)_n$$

formed by a plurality of identical low molecular weight members Ar—N=N, wherein Ar stands for a group which has both a coupling position and at least one salt-forming substituent and comprises an aromatic radical capable of carrying an azo group, $n$ stands for an integer greater than one, said members Ar—N=N being linked together by the azo group of one member being attached to the coupling position of the next member.

5. A process for producing a colored photographic material comprising at least two superposed colloid layers, at least one of said layers being a light sensitive silver halide layer and at least one of said layers being a colored colloid layer, which comprises coloring the colloid used for the production of said colored colloid layer with a soluble high molecular weight dye which includes the following general structure $$(-Ar-N=N-)_n$$

formed by a plurality of identical low molecular weight members Ar—N=N, wherein Ar stands for a group which has both a coupling position and at least one salt-forming substituent and comprises an aromatic radical capable of carrying an azo group, $n$ stands for an integer greater than one, said members Ar—N=N being linked together by the azo group of one member being attached to the coupling position of the next member.

6. A process for producing a colored photographic material comprising at least two superposed colloid layers, one of said layers being a colored light-sensitive silver halide emulsion layer, which comprises coloring the colloid used for the production of said colored light-sensitive silver halide emulsion layer with a soluble high molecular weight dye which includes the following general structure $$(-Ar-N=N-)_n$$

formed by a plurality of identical low molecular weight members Ar—N=N, wherein Ar stands for a group which has both a coupling position and at least one salt-forming substituent and comprises an aromatic radical capable of carrying an azo group, $n$ stands for an integer greater than one, said members Ar—N=N being linked together by the azo group of one member being attached to the coupling position of the next member.

7. A process for producing a colored photographic image in a photographic material comprising a plurality of colloid layers, at least one of said layers containing a silver image and at least one of said layers being diffusely dyed with a soluble high molecular weight dye which includes the following general structure $$(-Ar-N=N)_n$$

formed by a plurality of identical low molecular weight members Ar—N=N, wherein Ar stands for a group which has both a coupling position and at least one salt-forming substituent and comprises an aromatic radical capable of carrying an azo group, $n$ stands for an integer greater than one, said members Ar—N=N being linked together by the azo group of one member being attached to the coupling position of the next member which comprises treating said material to locally destroy by reduction said dye in the presence of said silver image and washing said material.

8. A process for producing a colored image in a colored photographic colloid layer containing a silver image, said layer being diffusely dyed with a soluble high molecular weight dye which includes the following general structure $$(-Ar-N=N-)_n$$

formed by a plurality of identical low molecular weight members Ar—N=N, wherein Ar stands for a group which has both a coupling position and at least one salt-forming substituent and comprises an aromatic radical capable of carrying an azo group, $n$ stands for an integer greater than one, said members Ar—N=N being linked together by the azo group of one member being attached to the coupling position of the next member which comprises treating said material to locally destroy by reduction said dye in the presence of said silver image and washing said material.

9. A process for producing a colored image in a colored photographic colloid layer containing a silver image, said layer being diffusely dyed with a soluble high molecular weight dye which includes the following general structure:

$$(-Ar-N=N-)_n$$

formed by a plurality of identical low molecular weight members Ar—N=N, wherein Ar stands for a group which has both a coupling position and at least one salt forming substituent and comprises an aromatic radical capable of carrying an azo group, $n$ stands for an integer greater than one, said members Ar—N=N being linked together by the azo group of one member being attached to the coupling position of the next member, which comprises treating said material to locally destroy by reduction said dye in the presence of said silver image and removing the dye reduction products from said layer by washing.

10. A photographic material comprising at least two superposed colloid layers, at least one of the layers being a light sensitive silver halide emulsion layer and at least one layer comprising a soluble high molecular weight dye which carries at least one solubilizing group and includes the following general structure:

$$[-B(-Ar_1-N=N-)_a Ar_2-]_n$$

formed by a plurality of low molecular weight members $$-B(-Ar_1-N=N-)_a Ar_2-$$

wherein $Ar_1$ and $Ar_2$ stand for a group comprising a radical selected from the class consisting of aromatic, heterocyclic and aliphatic radicals, B stands for a heteronuclear bond, $n$ stands for an integer greater than one and $a$ stands for an integer from one to four and the product of $a$ and $n$ is greater than two.

11. A photographic material comprising at least two superposed colloid layers, at least one of the layers being a light sensitive silver halide emulsion layer and at least one layer comprising a soluble high molecular weight dye which carries at least one solubilizing group and includes the following general structure:

$$[-B(-Ar_1-N=N-)_a Ar_2-]_n$$

formed by a plurality of low molecular weight members $$-B(-Ar_1-N=N-)_a Ar_2-$$

wherein $Ar_1$ and $Ar_2$ stand for a group comprising a radical selected from the class consisting of aromatic, heterocyclic and aliphatic radicals capable of carrying an azo group, B stands for a heteronuclear bond, $n$ stands for an integer greater than one and $a$ stands for an integer from one to four and the product of $a$ and $n$ is greater than two.

12. A photographic material comprising at least two superposed colloid layers, at least one of the layers being a light sensitive silver halide emulsion layer and at least one layer comprising a soluble high molecular weight dye which carries at least one solubilizing group and includes the following general structure:

$$[-B(-Ar_1-N=N-)_a Ar_2-]_n$$

formed by a plurality of identical low molecular weight members $$-B(-Ar_1-N=N-)_a Ar_2-$$

wherein $Ar_1$ and $Ar_2$ stand for a group comprising a radical selected from the class consisting of aromatic, heterocyclic and aliphatic radicals, B stands for a heteronuclear bond, $n$ stands for an integer greater than one and $a$ stands for an integer from one to four and the product of $a$ and $n$ is greater than two.

13. A photographic material comprising at least two superposed colloid layers, at least one of the layers being a light sensitive silver halide emulsion layer and at least one layer comprising a soluble high molecular weight dye which carries at least one solubilizing group and includes the following general structure:

$$[-B(-Ar_1-N=N-)_a Ar_2-]_n$$

formed by a plurality of differently colored low molecular weight members $$-B(-Ar_1-N=N-)_a Ar_2-$$

wherein $Ar_1$ and $Ar_2$ stand for a group comprising a radical selected from the class consisting of aromatic, heterocyclic and aliphatic radicals, B stands for a heteronuclear bond, $n$ stands for an integer greater than one and $a$ stands for an integer from one to four and the product of $a$ and $n$ is greater than two.

14. A photographic material comprising at least two superposed colloid layers, at least one of the layers being a light sensitive silver halide emulsion layer and at least one layer comprising a soluble high molecular weight dye which carries at least one solubilizing group and includes the following general structure:

$$[-B(-Ar_1-N=N-)_a Ar_2-]_n$$

formed by a plurality of identical low molecular weight members $$-B(-Ar_1-N=N-)_a Ar_2-$$

wherein $Ar_1$ and $Ar_2$ stand for a group comprising a radical selected from the class consisting of aromatic, heterocyclic and aliphatic radicals capable of carrying an azo group, B stands for a heteronuclear bond, $n$ stands for an integer greater than one and $a$ stands for an integer from one to four and the product of $a$ and $n$ is greater than two.

15. A photographic material comprising at least two superposed colloid layers, at least one of the layers being a light sensitive silver halide emulsion layer and at least one layer comprising a soluble high molecular weight dye which carries at least one solubilizing group and includes the following general structure:

$$[-B(-Ar_1-N=N-)_a Ar_2-]_n$$

formed by a plurality of differently colored low molecular weight members $$-B(-Ar_1-N=N-)_a Ar_2-$$

wherein $Ar_1$ and $Ar_2$ stand for a group comprising a radical selected from the class consisting of aromatic, heterocyclic and aliphatic radicals capable of carrying an azo group, B stands for a heteronuclear bond, $n$ stands for an integer greater than one and $a$ stands for an integer from one to four and the product of $a$ and $n$ is greater than two.

16. A photographic material comprising at least two superposed colloid layers, at least one of the layers being a light sensitive silver halide emulsion layer and at least one layer comprising a soluble high molecular weight azo dye formed by a chain which contains at least four low molecular weight members, each carrying at least one azo group and at least one heteronuclear bond linking together said members, the number of said heteronuclear bonds multiplied by the number of azo groups conjugated with each other giving a product which is greater than two.

17. A photographic material comprising at least two superposed colloid layers, at least one of the layers being a light sensitive silver halide emulsion layer and at least one layer comprising a soluble high molecular weight dye which carries at least one solubilizing group and includes the following general structure:

$$[-B(-Ar_1-N=N-)_a Ar_2-]_n$$

formed by a plurality of low molecular weight members $$-B(-Ar_1-N=N-)_a Ar_2-$$

wherein $Ar_1$ and $Ar_2$ stand for a group comprising a radical selected from the class consisting of aromatic, heterocyclic and aliphatic radicals capable of carrying an azo group, B stands for a heteronuclear bond which in at least one low molecular weight member of the series comprises the group —CO—NH—, $n$ stands for an integer greater than one and $a$ stands for an integer from one to four and the product of $a$ and $n$ is greater than two.

18. A photographic material comprising at least two superposed colloid layers, at least one of the layers being a light sensitive silver halide emulsion layer and at least one layer comprising a soluble high molecular weight dye which carries at least one solubilizing group and includes the following general structure:

$$[-B(-Ar_1-N=N-)_a Ar_2-]_n$$

formed by a plurality of low molecular weight members $$-B(-Ar_1-N=N-)_a Ar_2-$$

wherein $Ar_1$ and $Ar_2$ stand for a group comprising a radical selected from the class consisting of aromatic, heterocyclic and aliphatic radicals capable of carrying an azo group, B stands for a heteronuclear bond which in at least one low molecular weight member of the series comprises the group $-SO_2NH-$, $n$ stands for an integer greater than one and $a$ stands for an integer from one to four and the product of $a$ and $n$ is greater than two.

19. A photographic material comprising at least two superposed colloid layers, at least one of the layers being a light sensitive silver halide emulsion layer and at least one layer comprising a soluble high molecular weight dye which carries at least one solubilizing group and includes the following general structure:

$$[-B(-Ar_1-N=N-)_a Ar_2-]_n$$

formed by a plurality of low molecular weight members $$-B(-Ar_1-N=N-)_a Ar_2-$$

wherein $Ar_1$ and $Ar_2$ stand for a group comprising a radical selected from the class consisting of aromatic, heterocyclic and aliphatic radicals capable of carrying an azo group, B stands for a heteronuclear bond which in at least one low molecular weight member of the series comprises the group $-NH-X-NH-$ wherein X is the divalent radical of a dibasic organic acid, $n$ stands for an integer greater than one and $a$ stands for an integer from one to four and the product of $a$ and $n$ is greater than two.

BELA GASPAR.

REFERENCES CITED

The following references are of record in the file of this patent:

UNITED STATES PATENTS

| Number | Name | Date |
| --- | --- | --- |
| 2,071,688 | Gaspar | Feb. 23, 1937 |
| 2,178,167 | Gaspar | Oct. 31, 1939 |
| 2,281,149 | Gaspar | Apr. 28, 1942 |
| 2,286,714 | Chechak | June 16, 1942 |
| 2,286,837 | Seymour | June 16, 1942 |
| 2,294,892 | Carroll et al. | Sept. 8, 1942 |
| 2,294,893 | Carroll et al. | Sept. 8, 1942 |
| 2,342,620 | Woodward | Feb. 22, 1944 |
| 2,346,531 | Allen et al. | Apr. 11, 1944 |

FOREIGN PATENTS

| Number | Country | Date |
| --- | --- | --- |
| 219,653 | Great Britain | Apr. 30, 1925 |
| 822,348 | France | Dec. 28, 1937 |
| 496,559 | Great Britain | Nov. 30, 1938 |
| 204,534 | Switzerland | Aug. 1, 1939 |
| 541,073 | Great Britain | Nov. 12, 1941 |
| 549,176 | Great Britain | Nov. 10, 1942 |
| 551,500 | Great Britain | Feb. 25, 1943 |
| 551,501 | Great Britain | Feb. 25, 1943 |